(12) United States Patent
Welb et al.

(10) Patent No.: US 10,815,556 B2
(45) Date of Patent: *Oct. 27, 2020

(54) METHOD AND APPARATUS FOR PRODUCING A MIXTURE OF A METALLIC MATRIX MATERIAL AND AN ADDITIVE

(71) Applicant: Coperion GmbH, Stuttgart (DE)

(72) Inventors: Sören Welb, Ilsfeld (DE); Ulrich Conrad, Elze (DE)

(73) Assignee: Coperion GmbH, Stuttgart (DE)

( * ) Notice: Subject to any disclaimer, the term of this patent is extended or adjusted under 35 U.S.C. 154(b) by 218 days.

This patent is subject to a terminal disclaimer.

(21) Appl. No.: 15/764,500

(22) PCT Filed: Sep. 27, 2016

(86) PCT No.: PCT/EP2016/072944
§ 371 (c)(1),
(2) Date: Mar. 29, 2018

(87) PCT Pub. No.: WO2017/055259
PCT Pub. Date: Apr. 6, 2017

(65) Prior Publication Data
US 2018/0282846 A1 Oct. 4, 2018

(30) Foreign Application Priority Data
Oct. 1, 2015 (DE) .................. 10 2015 219 032

(51) Int. Cl.
*C22C 47/08* (2006.01)
*B22F 3/20* (2006.01)
(Continued)

(52) U.S. Cl.
CPC .............. *C22C 47/08* (2013.01); *B22F 3/003* (2013.01); *B22F 3/20* (2013.01); *C22C 1/0416* (2013.01);
(Continued)

(58) Field of Classification Search
CPC .. B22F 2999/00; B22F 2201/10; B22F 3/003; B22F 3/20; B22F 2202/07;
(Continued)

(56) References Cited

U.S. PATENT DOCUMENTS 4,676,224 A * 6/1987 Ohno ..................... C10C 3/12
126/343.5 R
2004/0084171 A1 5/2004 Akers et al.
(Continued)

FOREIGN PATENT DOCUMENTS

CN 202 846 846 U 4/2013
DE 102 96 848 T5 4/2004
(Continued)

*Primary Examiner* — Jenny R Wu
(74) *Attorney, Agent, or Firm* — McGlew and Tuttle, P.C.

(57) ABSTRACT

In a method for producing a mixture of a metallic matrix material and an additive, a metallic bulk material is molten in a multi-shaft screw machine in a heating zone thereof by means of an inductive heating device to form a metal matrix material. As the at least one housing portion of the housing of the multi-shaft screw machine is made of a non-magnetic and electrically non-conductive material at least partly in the heating zone, a high and efficient energy input for melting the metallic bulk material is achievable in a simple manner. The additive for producing the mixture is admixed to the metallic matrix material by means of treatment element shafts of the multi-shaft screw machine.

20 Claims, 7 Drawing Sheets

(51) Int. Cl.
 *B22F 3/00* (2006.01)
 *C22C 1/04* (2006.01)
 *C22C 1/10* (2006.01)
 *C22C 49/06* (2006.01)
 *C22C 49/04* (2006.01)

(52) U.S. Cl.
 CPC .............. *C22C 1/10* (2013.01); *C22C 1/1036* (2013.01); *C22C 49/04* (2013.01); *C22C 49/06* (2013.01); *B22F 2201/10* (2013.01); *B22F 2301/052* (2013.01); *B22F 2301/058* (2013.01); *B22F 2999/00* (2013.01); *C22C 1/0408* (2013.01)

(58) Field of Classification Search
 CPC ......... B22F 2301/052; B22F 2301/058; C22C 1/0408; C22C 1/0416; C22C 1/10; C22C 1/1036; C22C 47/08; C22C 49/04; C22C 49/06
 See application file for complete search history.

(56) References Cited

U.S. PATENT DOCUMENTS

| | | | |
|---|---|---|---|
| 2005/0148728 A1* | 7/2005 | Stoeppelmann | G08K 5/0016 525/63 |
| 2006/0070419 A1 | 4/2006 | Johnson et al. | |
| 2008/0264594 A1 | 10/2008 | Lohmueller et al. | |

FOREIGN PATENT DOCUMENTS

| | | |
|---|---|---|
| DE | 10 2005 052 470 B3 | 3/2007 |
| WO | 2015/154973 A1 | 10/2015 |

* cited by examiner

METHOD AND APPARATUS FOR PRODUCING A MIXTURE OF A METALLIC MATRIX MATERIAL AND AN ADDITIVE

CROSS REFERENCE TO RELATED APPLICATIONS

This application is a United States National Phase Application of International Application PCT/EP2016/072944 filed Sep. 27, 2016 and claims the benefit of priority under 35 U.S.C. § 119 of German Patent Application Serial No. DE 10 2015 219 032.3 filed Oct. 1, 2015, the entire contents of which are incorporated herein by reference.

FIELD OF THE INVENTION

The invention relates to a method and an apparatus for producing a mixture of a metallic matrix material and an additive.

BACKGROUND OF THE INVENTION

A method for producing a composite material is known from DE 10 2005 052 470 B3 (corresponding to US 2008/0264594 A1). By means of a plurality of strip heaters arranged in an extruder, metal particles are molten at least partly in such a way that a metallic matrix phase, in other words a metallic matrix material is provided in the extruder. By means of a dosing screw, reinforcing particles are added to the material matrix phase. In order to produce the composite material, the reinforcing particles are then admixed to the metallic matrix phase by means of the extruder. The process of melting the metal particles at least partly to form the metallic matrix phase and the subsequent admixture of the reinforcing particles is extremely elaborate. In particular, the machine requirements to perform this are extremely complex as the extruder needs to be comparatively long to melt the metal particles and to admix the reinforcing particles.

SUMMARY OF THE INVENTION

The invention is based on the object of providing a method that allows a homogeneous mixture of a metallic matrix material and an additive to be produced in a simple manner.

This object is achieved according to the invention by a method for producing a mixture of a metallic matrix material and an additive, the method comprising the following steps: providing a multi-shaft screw machine with a housing, which comprises a plurality of interconnected housing portions arranged in succession in a conveying direction, a plurality of housing bores formed in the housing, at least one feed opening leading into the housing bores, a plurality of treatment element shafts arranged in the housing bores in such a way as to be drivable for rotation, an inductive heating device configured to form a heating zone, wherein at least one housing portion in the heating zone is made of a non-magnetic and electrically non-conductive material at least partly, the inductive heating device comprises at least one coil that surrounds the treatment element shafts and defines an inner space, the at least one housing portion is made exclusively of the non-magnetic and electrically non-conductive material in the inner space, and the treatment element shafts comprise an electrically conductive material at least in the heating zone, a cooling device configured to dissipate thermal losses generated in the at least one coil, feeding a metallic bulk material and an additive into the housing bores via the at least one feed opening, melting the metallic bulk material by means of the inductive heating device to obtain a metallic matrix material, and producing a mixture of the metallic matrix material and the additive by means of the treatment element shafts. By means of the inductive heating device, the metallic bulk material is molten at least partly to form the metal matrix material, in other words a metallic matrix phase, in a simple and efficient manner. To ensure an efficient energy input into the metallic bulk material or the metal matrix material, the at least one housing portion in the heating zone is made of an electromagnetically transparent material, which is non-magnetic and electrically non-conductive at least partly. For the sake of clarity, the at least one housing portion in the heating zone is hereinafter also referred to as heating zone housing portion. The electromagnetically transparent material does not interact with the inductive heating device. In particular, the material is not ferromagnetic. Preferably, a plurality of heating zone housing portions, in particular all heating zone housing portions, are made of the non-magnetic and electrically non-conductive material at least partly. Due to the high and efficient energy input, the multi-shaft screw machine can be made relatively short, which reduces the complexity of the production facilities significantly. Due to the high and efficient energy input by means of the inductive heating device, the mechanical forces acting in the multi-shaft screw machine and the resulting wear can be reduced significantly. The complexity of the production facilities is thus reduced significantly. The high and efficient energy input ensures that the metallic bulk material is molten substantially completely, thus allowing the additive to be admixed homogeneously in a simple manner. The additive is in particular a reinforcing material and/or a filler.

The inductive heating device has at least one coil, which surrounds the treatment element shafts and defines an inner space, wherein the at least one heating zone housing portion is made exclusively of the non-magnetic and electrically non-conductive material in the inner space. This ensures a high and efficient energy input for melting the bulk material. Preferably, the material of the at least one heating zone housing portion arranged in the inner space is a ceramic and/or fiber-reinforced material, such as an oxide ceramic fiber-reinforced composite. Oxide ceramic fiber-reinforced composites combine positive properties of metals and ceramics, such as electromagnetic transparency, electric and thermal insulating ability, ductile and non-brittle breaking behavior, high tensile and bending stiffness, oxidation and corrosion resistance, high temperature stability up to temperatures above 1300° C., and thermal shock resistance. As the alternating magnetic field of the at least one coil provides only a low energy input into electrically conductive components outside the inner space, the areas of the at least one heating zone housing portion disposed outside the inner space can be made of an electrically conductive material. Alternatively, the areas of the at least one heating zone housing portion disposed outside the inner space may also be made of a non-magnetic and electrically non-conductive material. The coil axis or longitudinal center axis of the at least one coil is aligned towards the rotational axes of the treatment element shafts. Ideally, a longitudinal center axis of the at least one coil is parallel to the rotational axes of the treatment element shafts. The at least one coil is arranged in the manner of a Helmholtz coil, with the treatment element shafts forming a core. The field lines of the alternating magnetic field are therefore concentrated in the inner space and in the treatment element shafts so a high energy input into the treatment element shafts is possible in a simple manner. The length of the heating zone in the conveying direction is adjustable via the length of the at least one coil and/or the number of the coils. The length of the at least one coil is adjustable via the number and/or the distance of the windings. The at least one coil is heated by ohmic losses. The thermal losses generated in the at least one coil are dissipated by means of the cooling device. The cooling device is in particular configured as a water cooling device. The at least one coil can therefore be operated at a high power. Preferably, the at least one coil forms a separate cooling duct through which a coolant can flow. The coolant is in particular water. A receiving space in which the at least one coil is arranged and which is entirely surrounded by the at least one heating zone housing portion can also be used as a cooling duct. To avoid ohmic losses, the at least one coil is in particular made of aluminum or copper.

The metallic bulk material is preferably made of at least one light metal or at least one light metal alloy. The light metal or the light metal alloy in particular has a density of at most 5 g/cm$^3$ at 20° C. The light metal is in particular magnesium or aluminum. The additive is in particular configured in the form of reinforcing particles and/or reinforcing fibers.

The non-magnetic and electrically non-conductive material of the at least one heating zone housing portion is in particular a non-metal material such as a ceramic and/or fiber-reinforced material. The electrically conductive material of the treatment element shaft is in particular a metal material, for example steel.

Preferably, the multi-shaft screw machine is configured as a twin-shaft screw machine. The treatment element shafts are drivable for rotation in particular in the same direction. The treatment element shafts are preferably configured as closely intermeshing pairs. Preferably, the treatment element shafts are each provided with a shaft on which a plurality of treatment elements are non-rotationally arranged in succession when seen in the conveying direction. The treatment elements are configured as screw elements and/or kneading elements, for example. The respective kneading element may be a single kneading disk or a single-part kneading block made of a plurality of interconnected kneading disks.

Preferably, the multi-shaft screw machine has a temperature measuring sensor for measuring a temperature of the metallic bulk material or the metal matrix material, wherein the inductive heating device is controlled in response to the measured temperature by means of a control device. The temperature measured by means of the temperature measuring sensor allows the power of the inductive heating device to be adjusted in response to the measured temperature. For example, the control device compares the measured temperature with a desired nominal temperature required for melting and changes the power of the inductive heating device, if necessary. The control device adjusts in particular a frequency f and/or an amplitude of an alternating voltage and/or of an alternating current used to operate the inductive heating device. For example, the inductive heating device is provided with an energy supply device comprising a frequency converter.

A method according to which the metallic bulk material is heated directly using the inductive heating device ensures a high and efficient energy input into the metal bulk material. The alternating magnetic field generated by the inductive heating device causes eddy currents to be induced in the metallic bulk material and—if any—in the metal matrix material, which result in eddy current losses, which, in particular together with hysteresis losses, lead to a direct temperature increase of the metallic bulk material and—if any—of the metal matrix material. The metallic bulk material and the metallic matrix material is therefore electrically conductive and/or magnetic. Contrary thereto, the alternating magnetic field does not interact with the non-magnetic and electrically non-conductive material of the at least one heating zone housing portion so an undesirable energy input into the at least one heating zone housing portion is effectively prevented.

A method according to which the treatment element shafts are heated using the inductive heating device and the metallic bulk material is heated indirectly by the treatment element shafts ensures a high and efficient energy input into the metal bulk material. The alternating magnetic field generated by the inductive heating device and interacting with the treatment element shafts causes eddy currents to be induced in the treatment element shafts, said eddy currents causing eddy current losses to develop, which, in particular together with hysteresis losses, lead to a direct temperature increase of the treatment element shafts. The treatment element shafts are in close contact with and surrounded by the metallic bulk material and the metallic matrix material over a large surface area thereof, with the result that the metallic bulk material and the metallic matrix material are heated indirectly by the treatment element shafts. The electrically conductive material is in particular ferrous and ferromagnetic. Contrary thereto, the alternating magnetic field does not interact with the non-magnetic and electrically non-conductive material of the at least one heating zone housing portion, with the result that an undesirable energy input into the at least one heating zone housing portion is effectively prevented.

A method according to which the treatment element shafts are heated using the inductive heating device prior to the feeding of the metallic bulk material provides a simple manner of melting the metal bulk material. The treatment element shafts are pre-heated using the inductive heating device so when the metallic bulk material contacts the treatment element shafts, there is an immediate energy input into the metal bulk material, causing the metallic bulk material to be molten simply and rapidly.

A method according to which the at least one housing portion comprises an inner sleeve that delimits the housing bores in the heating zone at least partly and the inner sleeve is made of the non-magnetic and electrically non-conductive material provides a simple manner of ensuring a high and efficient energy input for melting the metal bulk material. The inner sleeve is arranged in the inner space of the at least one coil and does not interact with the alternating magnetic field, thus preventing an energy input into the inner sleeve. In particular, only the inner sleeve of the associated heating zone housing portion is arranged in the inner space. Preferably, the inner sleeve defines at least part of a receiving space in which the at least one coil is arranged. Arranging the at least one coil in the receiving space ensures that the coil is protected by the at least one heating zone housing portion.

A method according to which the metallic bulk material and/or the additive are fed in an inert gas atmosphere provides a simple manner of using a light metal or a light metal alloy for producing the mixture. The inert gas atmosphere prevents undesirable and dangerous chemical reactions.

A method according to which the metallic bulk material and the additive are fed upstream of the heating zone, in particular via a common feed opening, provides a simple manner of producing a homogeneous mixture. As the metallic bulk material is heated rapidly by means of the inductive heating device, the additive can already be fed thereto upstream of the heating zone. This reduces the complexity of the production facilities. The metallic bulk material and the additive can be fed via a common feed opening or by separate feed openings upstream of the heating zone.

A method according to which the metallic bulk material is fed via a first feed opening upstream of the heating zone and the additive is fed via a second feed opening downstream of the heating zone provides a simple and reliable manner of producing a homogeneous mixture. Feeding the additive downstream of the heating zone allows the additive to be admixed to the already molten metallic matrix material in a simple manner.

A method according to which the metallic bulk material and/or the additive are fed by means of at least one feed device provides a simple and flexible manner of producing a desired mixture. The metallic bulk material and the additive can be fed via a common feed device arranged upstream of the heating zone or via separate feed devices arranged upstream of the heating zone, or the metallic bulk material can be fed via a separate feed device arranged upstream of the heating zone while the additive is fed by means of a separate feed device arranged downstream of the heating zone. The feed device for the metallic bulk material is in particular provided with a gravimetric dosing unit. The feed device for the additive is provided with a gravimetric dosing unit and/or a dosing/feed screw.

A method according to which the inductive heating device is operable at a frequency f in order to generate an alternating magnetic field, the frequency f being such that 1 kHz<f≤50 kHz, in particular 5 kHz≤f≤45 kHz, and in particular 10 kHz≤f≤40 kHz, provides a simple manner of ensuring a high and efficient energy input for melting the metal bulk material. The inductive heating device is operable at a frequency f to generate an alternating magnetic field, the frequency f being such that 1 kHz<f≤50 kHz, in particular 5 kHz≤f≤45 kHz, and in particular 10 kHz≤f≤40 kHz. If the inductive heating device is operated at a frequency f in this first frequency range, this provides an effective way of ensuring a high energy input into the metallic bulk material and/or into the treatment element shafts. As the at least one heating zone housing portion is made of the nonmagnetic and electrically non-conductive material, an energy input into the at least one heating zone housing portion is effectively prevented. As an alternative or in addition thereto, the inductive heating device can be operated at a frequency f in a second frequency range, the frequency f being such that 140 kHz≤f≤360 kHz, in particular 150 kHz≤f≤350 kHz, and in particular 160 kHz≤f≤340 kHz. Operating the inductive heating device in the two frequency ranges permits an excitement or temperature increase in various penetration depths, for example in the metallic bulk material and/or in the treatment element shafts. The inductive heating device is operated in the first frequency range and the second frequency range preferably alternately. This provides an efficient manner of ensuring a high energy input. An energy supply device of the inductive heating device in particular comprises a frequency converter allowing the frequency f and/or an amplitude of an alternating voltage and/or of an alternating current to be adjusted.

The invention is further based on the object of providing an apparatus that allows a homogeneous mixture of a metallic matrix material and an additive to be produced in a simple manner.

This object is achieved by an apparatus for producing a mixture of a metallic matrix material and an additive, the apparatus comprising a multi-shaft screw machine with a housing, which comprises a plurality of interconnected housing portions arranged in succession in a conveying direction, a plurality of housing bores formed in the housing, at least one feed opening leading into the housing bores, a plurality of treatment element shafts arranged in the housing bores in such a way as to be drivable for rotation, an inductive heating device configured to form a heating zone, wherein at least one housing portion in the heating zone is made of a non-magnetic and electrically non-conductive material at least partly, the inductive heating device comprises at least one coil that surrounds the treatment element shafts and defines an inner space, the at least one housing portion is made exclusively of the non-magnetic and electrically non-conductive material in the inner space, and the treatment element shafts comprise an electrically conductive material at least in the heating zone, a cooling device configured to dissipate thermal losses generated in the at least one coil, and at least one feed device configured to feed a metallic bulk material and an additive into the housing bores via the at least one feed opening. The advantages of the apparatus according to the invention are the same as the advantages of the method according to the invention already described above. In particular, the apparatus according to the invention can also be further developed with the features of the method according to the invention and vice versa.

An apparatus configured such that the at least one housing portion comprises an inner sleeve that delimits the housing bores in the heating zone at least partly and the inner sleeve is made of the non-magnetic and electrically non-conductive material provides a simple manner of ensuring a high and efficient energy input for melting the metal bulk material. The inner sleeve is arranged in an inner space of at least one coil of the inductive heating device. Preferably, only the inner sleeve of the associated at least one heating zone housing portion is arranged in the inner space of the at least one coil.

An apparatus configured such that the at least one housing portion comprises at least one outer part and one inner sleeve, the at least one outer part is arranged in particular outside an inner space of at least one coil of the inductive heating device, and the inner sleeve is supported against the at least one outer part provides a simple manner of producing a homogeneous mixture. The inner sleeve arranged inside the inner space is supported against the at least one outer part in such a way that the mechanical stability of the inner sleeve is guaranteed. The inner sleeve is preferably supported the at least one outer part on both ends. In order to increase the mechanical stability, the inner sleeve may additionally be supported against the at least one outer part between its ends. The at least one outer part is configured as an outer jacket, for example. The inner sleeve is supported against the outer part on at least two support positions along the rotational axes, in particular on at least three support positions and in particular on at least four support positions.

An apparatus configured such that the at least one feed device comprises a gravimetric dosing unit and/or a feed screw machine provides a simple manner of producing a homogeneous mixture. The apparatus may have a common feed device for feeding the metallic bulk material and the additive. The apparatus may further have a first feed device for feeding the metallic bulk material and a second feed device for feeding the additive. The feed device for feeding the metallic bulk material comprises in particular a gravimetric dosing unit. The feed unit for feeding the additive further comprises in particular a gravimetric dosing unit and/or a feed screw. Preferably, the at least one feed device has a respective inert gas feed opening for feeding the metallic bulk material and/or the additive in an inert gas atmosphere.

An apparatus configured such that the inductive heating device comprises an energy supply device with a frequency converter which allows a frequency f to be set, the frequency f being such that 1 kHz<f≤50 kHz, in particular 5 kHz≤f≤45 kHz, and in particular 10 kHz≤f≤40 kHz, ensures a high and efficient energy input for melting the metallic bulk material in a simple manner. The inductive heating device is operated in particular at a frequency in this first frequency range and a second frequency range, with the frequency f in the second frequency range being such that 140 kHz≤f≤360 kHz, in particular 150 kHz≤f≤350 kHz, and in particular 160 kHz≤f≤340 kHz. The inductive heating device is operated in the first frequency range and in the second frequency range preferably alternately.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
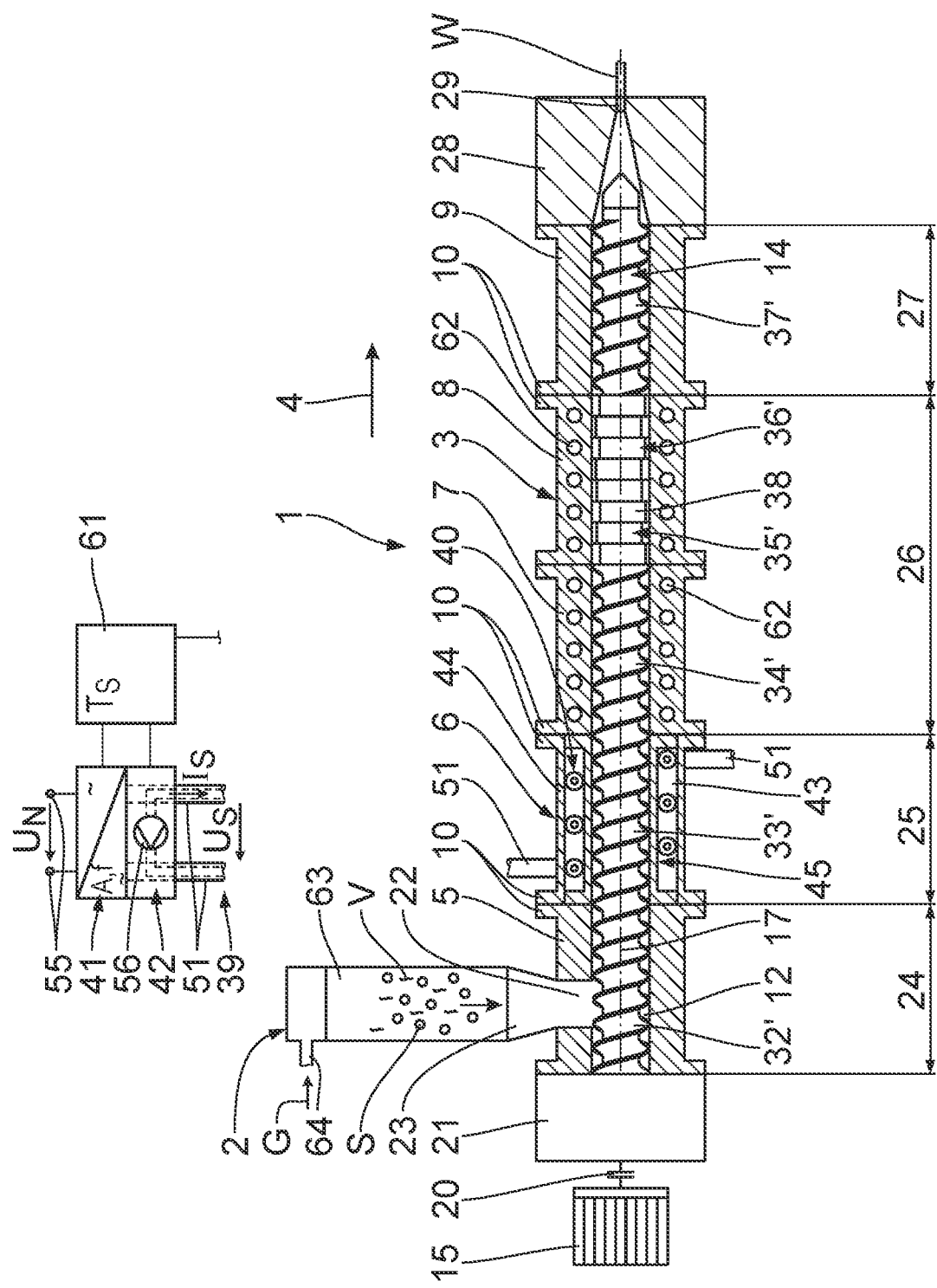
FIG. 1 is a partly sectional view of an apparatus for producing a mixture of a metallic matrix material and an additive according to a first exemplary embodiment.

A first exemplary embodiment of the invention will now be described with reference to FIGS. 1 to 4. An apparatus shown in FIG. 1 has a multi-shaft screw machine 1 and a feed device 2 for feeding a metallic bulk material S and an additive V. The screw machine 1 has a housing 3 made of a plurality of housing portions 5 to 9, also referred to as housing units, arranged in succession in a conveying direction 4 of the metallic bulk material S. The housing portions 5 to 9 are connected to each other via flanges 10 arranged at the ends thereof in such a way as to form the housing 3.

In the housing 3, two housing bores 11, 12 are formed, which are parallel to one another and penetrate one another in such a way as to have the shape of a horizontal Figure eight when seen in cross-section. In the housing bores 11, 12, two treatment element shafts 13, 14 are arranged concentrically, which are drivable for rotation about associated rotational axes 16, 17 by means of a drive motor 15. The treatment element shafts 13, 14 are driven about the rotational axes 16, 17 in the same direction, i.e. in the same rotational directions 18, 19. A coupling 20 and branching gear unit 21 are arranged between the drive motor 15 and the treatment element shafts 13, 14.

In the first housing portion 5 adjacent to the branching gear unit 21, a feed opening 22 is formed through which the metallic bulk material S and the additive V are feedable into the housing bores 11, 12. For the feeding through the feed opening 22, a hopper 23 is arranged on the first housing portion 5.

The screw machine 1 has an inlet zone 24, a heating zone 25, a homogenizing zone 26 and a pressure build-up zone 27, which are arranged in succession in the conveying direction 4. At the last housing portion 9, the housing 3 is closed by a nozzle plate 28 provided with a discharge opening 29.

The treatment element shafts 13, 14 are formed by shafts 30, 31 and treatment elements 32 to 37 or 32' to 37', respectively, arranged thereon. The treatment elements 32 to 37 arranged on the first shaft 30 and the treatment elements 32' to 37' arranged on the second shaft 31 correspond to each other, with the reference numerals of the treatment elements 32' to 37' arranged on the second shaft 31 having an additional ', allowing them to be differentiated from the treatment elements 32 to 37 arranged on the first shaft 30.

The treatment elements 32 to 37 and 32' to 37' are configured as closely intermeshing pairs, in other words the engage one another. The treatment elements are configured as screw elements 32, 32' and 33, 33' in the inlet zone 24 and in the heating zone 25. In the homogenizing zone 26 arranged downstream thereof, the treatment elements are configured as screw elements 34, 34' and kneading elements 35, 36 as well as 35', 36'. Each of the kneading elements 35, 36 and 35', 36' is configured as a kneading block, in other words each of them is configured in one piece. The kneading elements 35, 36 and 35', 36' each have a plurality of kneading disks 38, 38', which are arranged at an angular offset to each other and are connected to each other. In the pressure build-up zone 27, the treatment elements are again configured as screw elements 37, 37'.

The treatment elements 32 to 37 and 32' to 37' are arranged on the associated shafts 31, 31 in non-rotational manner. To this end, the shafts 30, 31 have an outer profile A that engages a corresponding inner profile I of the treatment elements 32 to 37 and 32' to 37'.

In order to melt the metallic bulk material S in the heating zone 25, the screw machine 1 has an inductive heating device 39. The inductive heating device 39 comprises a coil 40, an associated energy supply device 41 and a cooling device 42.

The coil 40 is arranged in a receiving space 43 formed in the housing portion 6. The housing portion 6 located in the heating zone 25 will hereinafter also be referred to as heating zone housing portion. The housing portion 6 has an outer part 44 in which an inner sleeve 45 is arranged. The outer part 44 is configured as an outer jacket. The outer jacket 44 and the inner sleeve 45 define the receiving space 43. The flanges 10 are formed on the outer jacket 44 at the ends of the housing portion 6 while the housing bores 11, 12 are formed in a first inner sleeve portion 46 extending in the conveying direction 4. At the ends of the first inner sleeve portion 46, two inner sleeve portions 47, 48 are formed, which extend in a direction transverse to the rotational axes 16, 17 in order to seal the receiving space 43 at the ends thereof. Preferably, the inner sleeve 45 is secured in the outer jacket 44 by means of the second inner sleeve portions 47, 48, for example by an interference fit.

The coil 40 has a longitudinal center axis 49 and defines an inner space 50. The longitudinal center axis 49 extends essentially parallel to the rotational axes 16, 17 such that the treatment element shafts 13, 14 run through the inner space 50 of the coil 40. The coil 40 therefore surrounds the treatment element shafts 13, 14 in the heating zone 25.

The coil 40 comprises a conductor 51 in the usual manner, the conductor being wound to form the coil 40 with a plurality of windings. The conductor 51 comprises a material of good electrical conductivity such as aluminum or copper. In the conductor 51, a coolant duct 52 is formed, which is part of the cooling device 42. The conductor 51 is guided out of the coil 40 via through-openings 53, 54 formed in the outer jacket 44 at the ends of the coil 40. Outside the housing portion 6, the coolant duct 52 is connected to a coolant pump 56 provided to deliver a coolant through the coolant duct 52. The coolant pump 56 is part of the cooling device 42. Preferably, water is used as coolant.

The coil 40 is connected to the energy supply device 41, which supplies the coil 40 with an alternating voltage $U_S$ and/or an alternating current $I_S$ with an adjustable frequency f and/or an adjustable amplitude A. The energy supply device 41 is in particular a frequency converter. The energy supply device 41 is connected, via terminals 55, to a mains power supply that provides a mains voltage $U_N$.

Melting the metallic bulk material S takes place by means of the treatment elements 32, 32', 33 and 33'. The treatment elements 33, 33' have a three-layer design, thus ensuring a simple and more efficient temperature increase. An inner torque transmitting layer 57 is surrounded by an insulating layer 58, which in turn is surrounded by an outer heating layer 59. The insulating layer 58 of the respective treatment element 33, 33' thermally insulates the associated heating layer 59 from the associated torque transmitting layer 57 and the associated shaft 30 or 31, respectively. To this end, the respective insulating layer 58 is provided over the entire circumference and the entire length of the torque transmitting layer 57. The respective insulating layer 58 therefore surrounds the associated rotational axis 16 or 17, respectively. The respective heating layer 59 forms a surface of the treatment element 33 or 33'.

In order to form the layers 57 to 59, the treatment elements 33, 33' are made of a metal ceramics composite material. The respective torque transmitting layer 57 is made of a first metal $M_1$ while the respective heating layer 59 is made of a second metal material $M_3$, whereas the respective insulating layer 58 arranged therebetween is made of a ceramic material $M_2$. Material $M_1$ is a steel, for example, as steel possesses a suitable mechanical strength. Contrary thereto, material $M_2$ is thermally and electrically non-conductive and non-magnetic, in other words it is electromagnetically transparent. Material $M_3$ is ferrous, i.e. a steel, for example, so eddy currents induced by means of the inductive heating device 39 may produce eddy current losses by means of which the heating layers 59 can be heated to a desired heating temperature $T_H$. Furthermore, the alternating magnetic field of the inductive heating device 39 causes hysteresis losses to develop in the ferrous material $M_3$, resulting in an additional temperature increase of the heating layers 59.

The inner sleeve 45 is made of an electromagnetically transparent material $M_4$. The electromagnetically transparent material $M_4$ is non-magnetic and electrically non-conductive. This prevents a temperature increase of the inner sleeve 45 caused by the alternating magnetic field of the inductive heating device 39. Material $M_4$ is preferably a ceramic material. Material $M_4$ is an oxide ceramic fiber-reinforced composite, for example. An oxide ceramic fiber-reinforced composite combines properties of a metal with those of a ceramics, such as electromagnetic transparency, electric and thermal insulating ability, ductile and non-brittle breaking behavior, high tensile and bending stiffness, thermal shock resistance and high temperature stability up to temperatures above 1300° C.

In the inner space 50, the heating zone housing portion 6 is made exclusively of the non-magnetic and electrically non-conductive material $M_4$. The portion of the inner sleeve 54 located in the inner space 50 is made exclusively of the non-magnetic and electrically non-conductive material $M_4$.

As the outer jacket 44 is arranged outside the coil 40, only low eddy currents are induced in the outer jacket 44 by the alternating magnetic field. The outer jacket 44 is therefore made of a metal material $M_5$. Preferably, the other housing portions 5 and 7 to 9 are made of the metal material $M_5$ as well. The metal material $M_5$ is in particular a steel. Alternatively, the outer jacket 44 may be made of the material $M_4$ as well. This prevents a temperature increase of the outer jacket 44 substantially completely.

In order to measure a temperature $T_K$ of the metallic bulk material S or of the metallic matrix material S', the screw machine 1 has a temperature measuring sensor 60. The temperature measuring sensor 60 is arranged on the housing portion 7 at the beginning of the homogenizing zone 26, for example. The temperature measuring sensor 60 is in signal communication with a control device 61 used to control the screw machine 1 and in particular the inductive heating device 39. To this end, the control device 61 is in particular in signal communication with the energy supply device 41 and the cooling device 42. The control device is in particular used to control the inductive heating device 39 in response to the measured temperature $T_K$.

The screw machine 1 further has a cooling device, which comprises cooling ducts 62 formed in the housing portions 7 and 8. The cooling ducts 62 allow delivery, by means of a coolant pump not shown in more detail, of a coolant in the usual manner. The coolant is in particular water. If necessary, cooling ducts 62 can also be formed in the outer jacket 44 of the housing portion 6.

The feed device 2 is used to feed the metallic bulk material S and the additive V through the feed opening 22, which—relative to the conveying direction 4—is arranged upstream of the heating zone 25. The feed device 2 comprises a gravimetric dosing unit 63. The gravimetric dosing unit 63 is used for the dosed feeding of the mixture of the metallic bulk material S and the additive V. The feed device 2 further comprises an inert gas feed opening 64 for feeding inert gas G in order to create an inert gas atmosphere. The inert gas G can be supplied from an inert gas storage device using an inert gas conveyor, for example.

The functioning of the apparatus is as follows:

Via the feed opening 22, a mixture of the metallic bulk material S and the additive V are fed to the screw machine 1 by means of the feed device 2.

Feeding to the screw machine 1 takes place in an inert gas atmosphere. To this end, an inert gas G is introduced into the feed device 2 via the inert gas feed opening 64.

By means of the gravimetric dosing unit 63, the mixture is fed to the screw machine 1 in defined doses.

The treatment element shafts 13, 14 are preheated by means of the inductive heating device 39 prior to the feeding of the metallic bulk material S. To this end, the treatment elements 33, 33' are heated using the inductive heating device 39. The treatment elements 33, 33' in turn heat the treatment elements 32, 32' in the inlet zone.

When, after feeding, the mixture comes into contact with the treatment element shafts 13, 14 in the inlet zone 24, the metallic bulk material S is immediately heated indirectly by the treatment element shafts 13, 14 and the treatment elements 32, 32. The mixture is conveyed to the heating zone 25 in the conveying direction 4. In the heating zone 25, the metallic bulk material S is heated directly by means of the inductive heating device 39 and indirectly by means of the treatment element shafts 13, 14 and the heated treatment elements 33, 33'. In the heating zone 25 at the latest, the metallic bulk material S is molten at least partly to form a metallic matrix material S' or a metallic matrix phase.

In order to melt the metallic bulk material S, the inductive heating device 39 generates an alternating electromagnetic field by means of the energy supply device 41 and the coil 40. The inductive heating device 39 is in particular operated at a frequency f, the frequency f in a first frequency range being such that 1 kHz<f≤50 kHz, in particular 5 kHz≤f≤45 kHz, and in particular 10 kHz≤f≤40 kHz. Furthermore, the frequency in a second frequency range is such that 140 kHz≤f≤360 kHz, in particular 150 kHz≤f≤350 kHz, and in particular 160 kHz≤f≤340 kHz. The inductive heating device 39 is operated in the first frequency range and/or in the second frequency range. Preferably, the inductive heating device 39 is operated in both frequency ranges alternately, with the result that various penetration depths of the alternating magnetic field are achieved.

Figure 2:
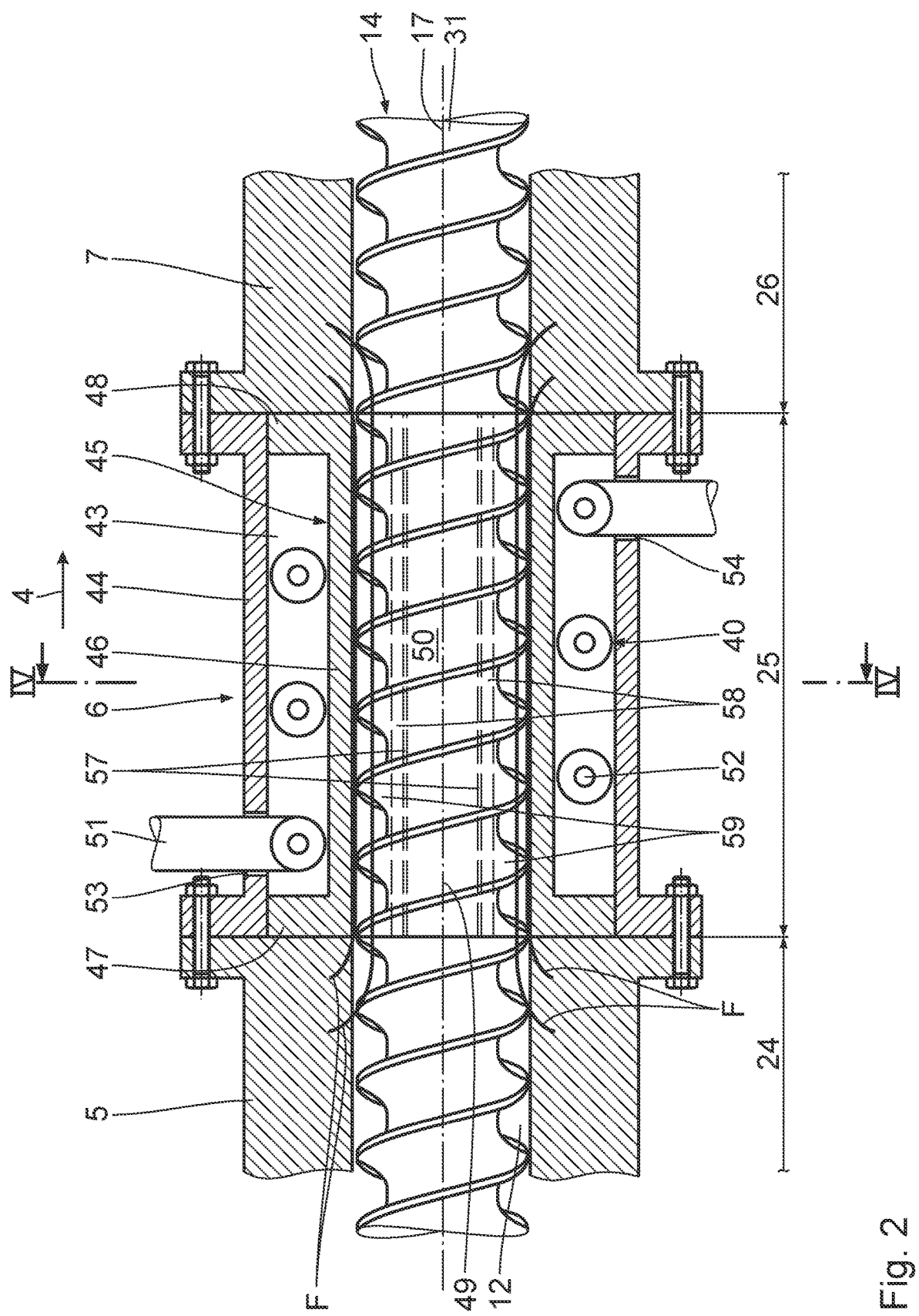
FIG. 2 is an enlarged view of a multi-shaft screw machine of the apparatus in FIG. 1 in the region of an inductive heating device.
Figure 3:
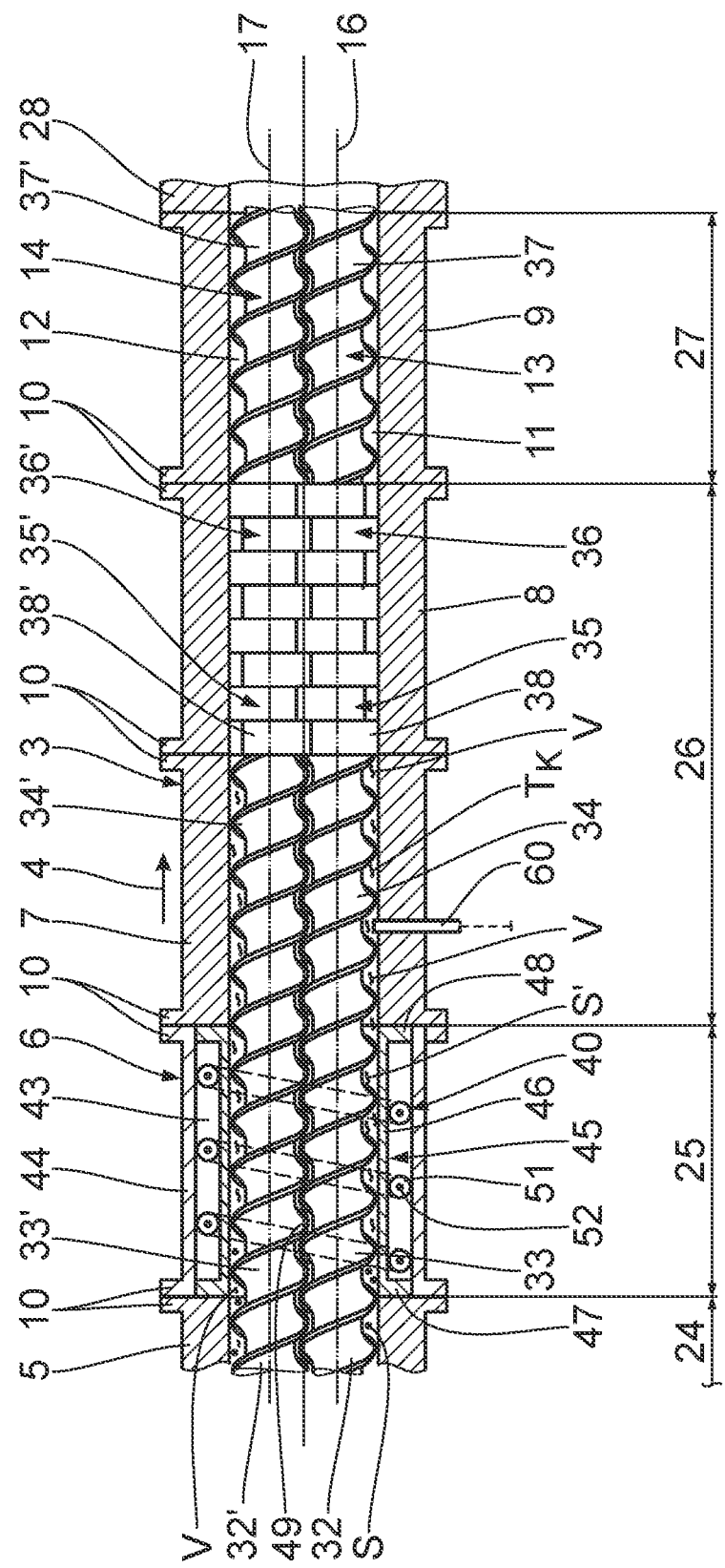
FIG. 3 is a partly sectional plan view of the multi-shaft screw machine of the apparatus in FIG. 1.
Figure 4:
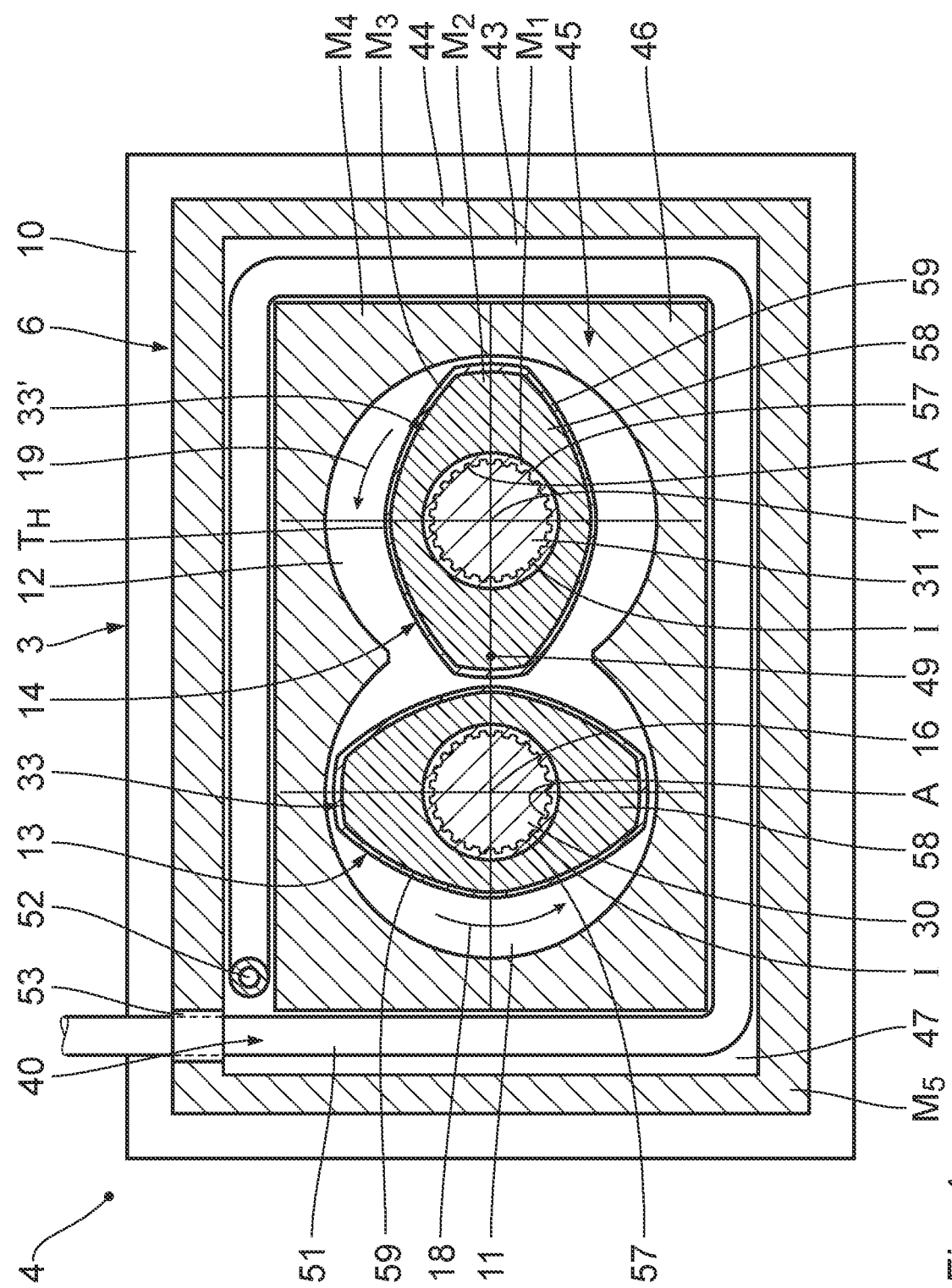
FIG. 4 is a cross-sectional view of the multi-shaft screw machine along portion line IV-IV in FIG. 2.

Field lines F of the alternating magnetic field are illustrated in FIG. 2. The concentration of the field lines F is high in the inner space 50 of the coil 40 so the magnetic field strength is high there. The treatment element shafts 13, 14 further act in the manner of a core. The alternating magnetic field causes eddy currents to be induced in the heating layers 59, the eddy currents producing ohmic eddy current losses. Furthermore, the alternating magnetic field causes hysteresis losses to develop in the heating layers 59. The ohmic eddy current losses and the hysteresis losses lead to a temperature increase of the heating layers 59 to the heating temperature $T_H$. The heating temperature $T_H$ can be changed via the frequency f and/or the amplitude A. Due to the close contact with the treatment element shafts 13, 14, the metallic bulk material S is heated indirectly.

Accordingly, eddy currents are induced in the metallic bulk material S and in the metallic matrix material S', said eddy currents causing ohmic eddy current losses to develop. Furthermore, the alternating magnetic field causes hysteresis losses to develop in the metallic bulk material S or the metallic matrix material S'. The ohmic eddy current losses and the hysteresis losses cause the metallic bulk material S to heat up and to melt, and—after melting—result in a further temperature increase of the metallic matrix material S'. The temperature increase can be changed via the frequency f and/or via the amplitude A. The metallic bulk material S or the metallic matrix material S' is heated up to a temperature $T_K$.

As the inner sleeve 45 is made exclusively of the electromagnetically transparent material $M_4$, which is non-magnetic and electrically non-conductive, the alternating magnetic field does not produce a temperature increase of the inner sleeve 45. The energy provided by the inductive heating device 39 is therefore introduced into the metallic bulk material S in a simple and efficient manner. Furthermore, the insulating layers 58 prevent the heat generated in the heating layers 59 from being transferred in the direction of the shafts 30, 31. The temperature $T_K$ is measured by means of the temperature measuring sensor 60 and transmitted to the control device 61. The control device 61 compares the temperature $T_K$ with a predefined nominal temperature $T_S$, which is preferably above the melting temperature of the metallic bulk material S. If the temperature $T_K$ is below the nominal temperature $T_S$, then the control device 61 actuates the energy supply device 41 to increase the amplitude A and/or the frequency f. Conversely, if the temperature $T_K$ is too high, then the amplitude A and/or the frequency is reduced. As a high current $I_S$ flows through the conductor 51 of the coil 40, the conductor 51 needs to be cooled, if necessary. To this end, the cooling device 42 delivers a coolant, in particular water, through the cooling duct by means of the coolant pump 56.

In the homogenizing zone 26, the metallic matrix material S' and the additive V are homogenized to form a mixture W. If necessary, the housing portions 7, 8 are cooled in the homogenizing zone 26 by means of a coolant, in particular water, which is delivered through the cooling ducts 62. In the pressure build-up zone 27, the pressure of the mixture W is increased. The mixture W is then discharged through the discharge opening 29.

The metallic bulk material S is configured in the form of a powder and/or granular material. Preferably, the metallic bulk material S is a light metal or a light metal alloy. The light metal is magnesium or aluminum, for example. The inert gas atmosphere prevents an unwanted and dangerous chemical reaction of the light metal. The additive V is in the form of particles and/or fibers. The additive V is in particular a reinforcing material and/or a filler. The additive V is in the form of reinforcing fibers, for example.

As the energy is introduced into the metallic bulk material S or the metallic matrix material S' directly and with a high energy density by means of the inductive heating device 39, the temperature $T_K$ can be set precisely and maintained at this level so the metallic matrix material S' remains in the desired thixotropic state. As the heat is generated directly in the metallic bulk material S or the metallic matrix material S' and/or is transferred from the treatment element shafts 13, 14 to the metallic bulk material S or the metallic matrix material S', the thermal insulation of the screw machine 1 can be configured such as to have a simple and cost-effective design since unlike in prior art arrangements, it is not necessary for the heat to be conducted from the outside to the inside.

The screw machine 1 allows energy to be introduced into the metallic bulk material S or the metallic matrix material S' in a simple and efficient manner, thus allowing a mechanical energy input to be reduced significantly, with the result that the mechanical load and the wear of the screw machine 1 are reduced significantly. The efficient energy input further ensures an energy-saving operation of the screw machine 1. In relation to a total power of the screw machine 1, the inductive heating device 39 in particular has a heating power of 10% to 90%, in particular of 20% to 80%, and in particular of 30% of 70%. If necessary, the inductive heating device 39 can also be operated at a plurality of different frequencies fat the same time. This allows regions to be heated, which that are disposed at various distances thereof, such as the metallic bulk material S and the treatment element shafts 13, 14.

The treatment elements 33, 33' are made of a composite material, for example. The composite material is in particular produced by sintering or flame spraying. Methods for producing composite materials or composite bodies of this type are known.

Figure 5:
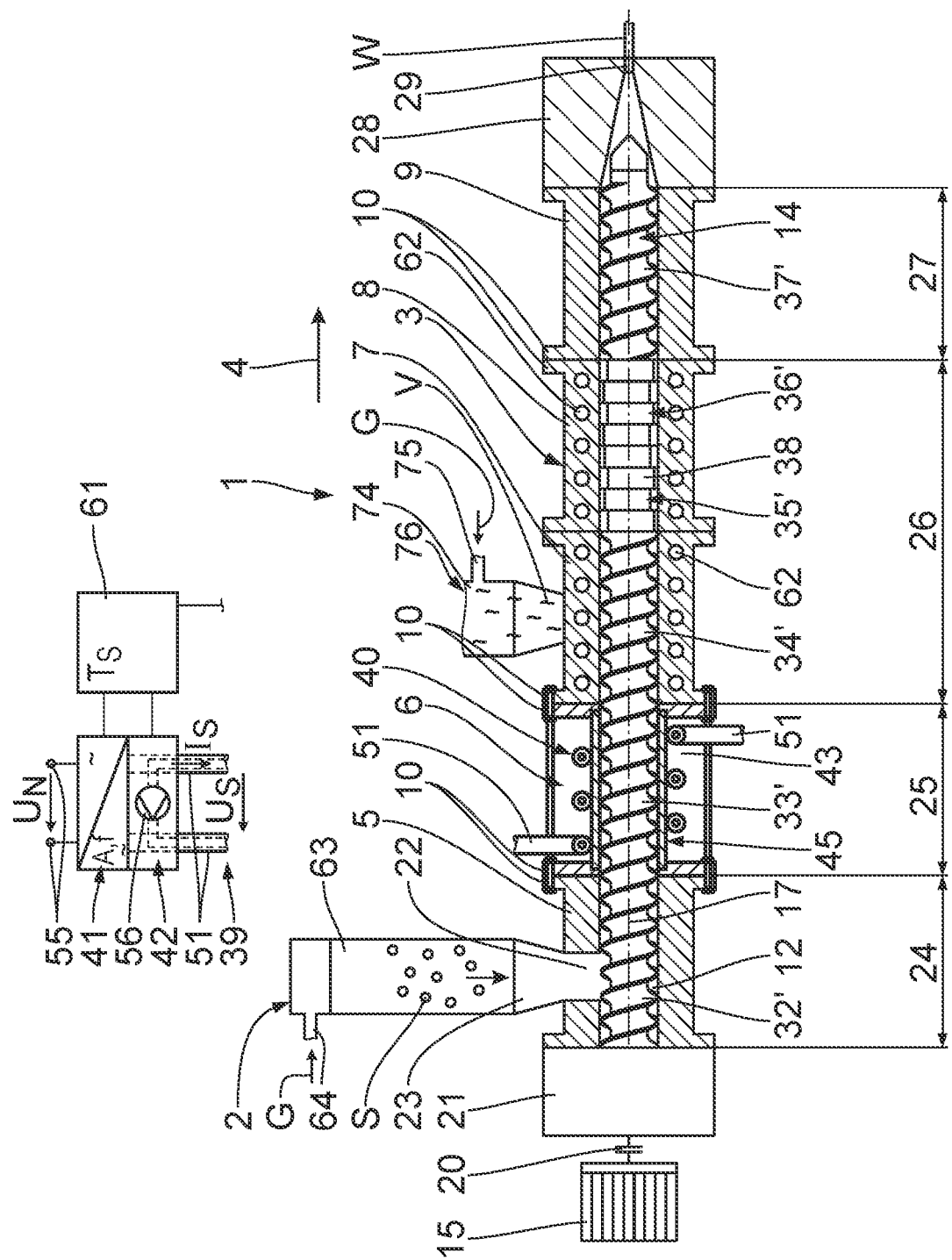
FIG. 5 is a partly sectional view of a device for producing a mixture of a metallic matrix material and an additive according to a second exemplary embodiment.
Figure 6:
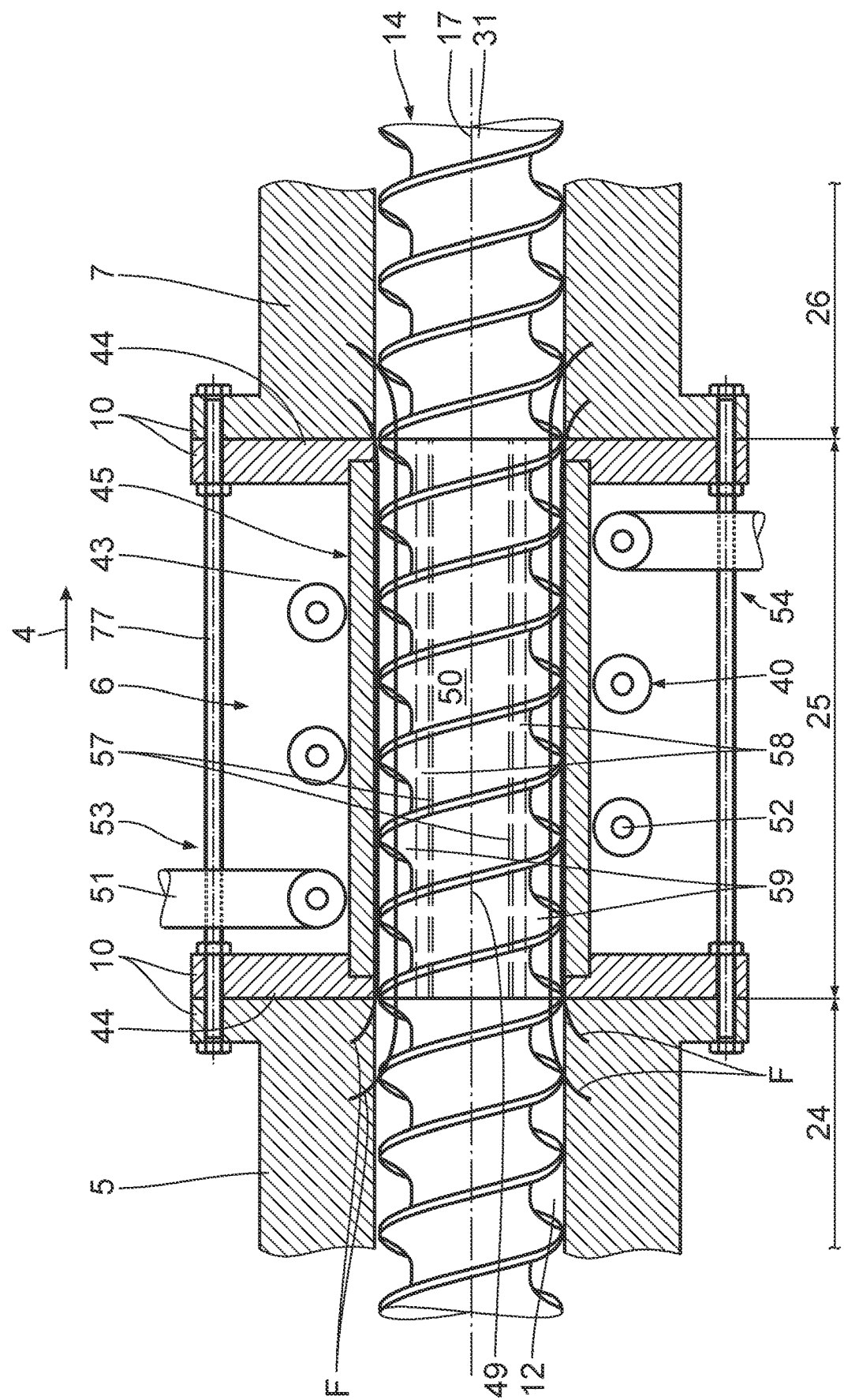
FIG. 6 is an enlarged view of a multi-shaft screw machine of the device in FIG. 5 in the region of an inductive heating device.
Figure 7:
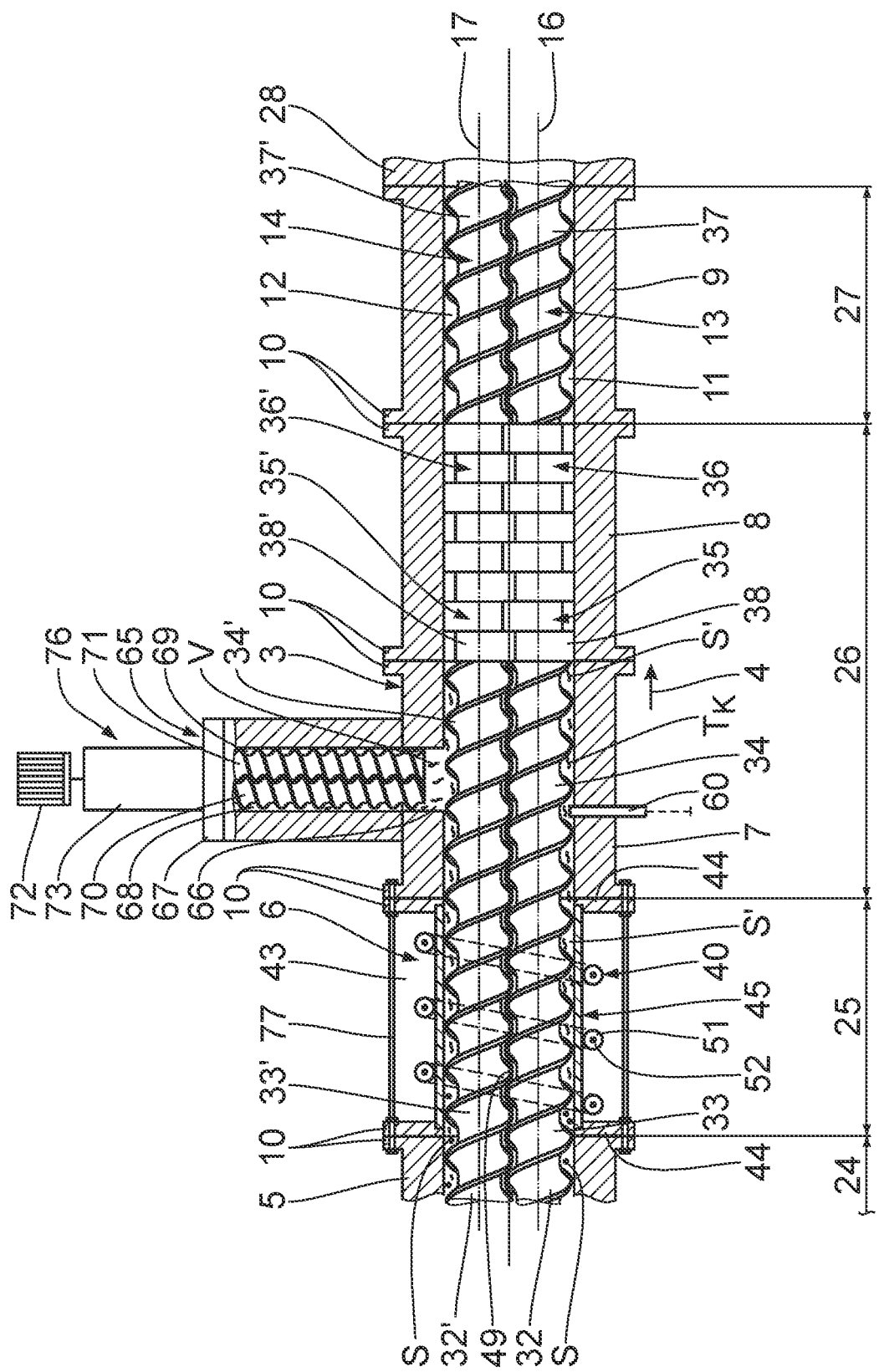
FIG. 7 is a partly sectional plan view of the multi-shaft screw machine of the apparatus in FIG. 5.

A second exemplary embodiment of the invention will hereinafter be described by means of FIGS. 5 to 7. Contrary to the first exemplary embodiment, the apparatus has a first feed device 2 for feeding the metallic bulk material S and a second feed device 76 for feeding the additive V. By means of a feed screw machine 65, the additive V is guided into the housing bores 11, 12 through a second feed opening 66 arranged downstream of the heating zone 25. The feed screw machine 65 has a housing 67 in which two housing bores 68, 69 are formed. In the housing bores 68, 69, two screw shafts 70, 71 are arranged, which are arranged such as to closely intermesh with each other. The screw shafts 70, 71 are driven for rotation in the same direction of rotation by means of a drive motor 72 and a branching gear unit 73. A feed line 74 comprising an inert gas feed opening 75 leads into the housing bores 68, 69. The additive V is therefore supplied to the metallic matrix material S' downstream of the heat zone 25 by means of the second feed device 76. The feed screw machine 65 is preferably configured as a side loader, in other words it is arranged at the side of the screw machine 1.

Contrary to the first exemplary embodiment, the heating zone housing portion 6 has an inner sleeve 45 the ends of which are received in two outer parts 44. The outer parts 44 are arranged outside the inner space 50. The outer parts 44 further have a plate-shaped design such as to form the flanges 10. The outer parts 44 are connected to one another by means of threaded rods 77 in such a way that a distance is provided therebetween. Furthermore, the threaded rods 77 provide a screw connection between the outer parts 44 and the adjacent housing portions 5 to 7. The receiving space 43 is therefore partly open to the outside. Between the threaded rods 77, the through openings 53, 54 for the conductor 51 are formed.

The additive V is supplied to the feed screw machine 65 in an inert gas atmosphere and introduced, by means of the screw machine 65, into the metallic matrix material S' located in the housing bores 13, 14. In the homogenizing zone 26, the mixture W is produced in the manner described above. Further details concerning the structure and the functioning of the second exemplary embodiment can be found in the description of the first exemplary embodiment.

The features of the exemplary embodiments can be used in any combination.

While specific embodiments of the invention have been shown and described in detail to illustrate the application of the principles of the invention, it will be understood that the invention may be embodied otherwise without departing from such principles.

The invention claimed is:

1. A method for producing a mixture of a metallic matrix material and an additive, the method comprising the following steps:

providing a multi-shaft screw machine comprising a housing, a plurality of housing bores formed in the housing, at least one feed opening leading into the housing bores, a plurality of treatment element shafts arranged in the housing bores in such a way as to be drivable for rotation and an inductive heating device configured to form a heating zone, the housing comprising a plurality of interconnected housing portions arranged in succession in a conveying direction, at least one housing portion in the heating zone being made at least partially of a non-magnetic and electrically non-conductive material, the inductive heating device comprising at least one coil that surrounds the treatment element shafts and defines an inner space, the at least one housing portion being made exclusively of the non-magnetic and electrically non-conductive material in the inner space, the treatment element shafts comprising an electrically conductive material at least in the heating zone, the multi-shaft screw machine further comprising a cooling device configured to dissipate thermal losses generated in the at least one coil, the at least one coil forming a separate cooling duct through which a coolant can flow;

feeding a metallic bulk material and an additive into the housing bores via the at least one feed opening;

melting the metallic bulk material by means of the inductive heating device to obtain a metallic matrix material; and producing a mixture of the metallic matrix material and the additive by means of the treatment element shafts.

2. A method according to claim 1, wherein the metallic bulk material is heated directly using the inductive heating device.

3. A method according to claim 1, wherein the treatment element shafts are heated using the inductive heating device, and the metallic bulk material is heated indirectly by the treatment element shafts.

4. A method according to claim 3, wherein the treatment element shafts are heated using the inductive heating device prior to feeding the metallic bulk material.

5. A method according to claim 1, wherein the at least one housing portion comprises an inner sleeve that at least partially delimits the housing bores in the heating zone, the inner sleeve being made of the non-magnetic and electrically non-conductive material.

6. A method according to claim 1, wherein at least one of the metallic bulk material and the additive is fed in an inert gas atmosphere.

7. A method according to claim 1, wherein the metallic bulk material and the additive are fed upstream of the heating zone.

8. A method according to claim 1, wherein the metallic bulk material is fed via a first feed opening upstream of the heating zone and the additive is fed via a second feed opening downstream of the heating zone.

9. A method according to claim 1, wherein at least one of the metallic bulk material and the additive is fed by means of at least one feed device.

10. A method according to claim 1, wherein in order to generate an alternating magnetic field, the inductive heating device is operable at a frequency, the frequency being greater than 1 kHz and less than or equal to 50 kHz.

11. An apparatus for producing a mixture of a metallic matrix material and an additive, the apparatus comprising a multi-shaft screw machine comprising a housing, a plurality of housing bores formed in the housing, at least one feed opening leading into the housing bores, a plurality of treatment element shafts arranged in the housing bores such that the plurality of treatment element shafts are drivable for rotation and an inductive heating device configured to form a heating zone, the housing comprising a plurality of interconnected housing portions arranged in succession in a conveying direction, at least one housing portion in the heating zone being made at least partially of a non-magnetic and electrically non-conductive material, the inductive heating device comprising at least one coil surrounding the treatment element shafts and the at least one coil defining an inner space, the at least one housing portion being made exclusively of the non-magnetic and electrically non-conductive material in the inner space, the treatment element shafts comprising an electrically conductive material at least in the heating zone, the multi-shaft screw machine further comprising a cooling device configured to dissipate thermal losses generated in the at least one coil, the at least one coil forming a separate cooling duct through which a coolant can flow;

at least one feed device configured to feed a metallic bulk material and an additive into the housing bores via the at least one feed opening.

12. An apparatus according to claim 11, wherein the at least one housing portion comprises an inner sleeve that at least partially delimits the housing bores in the heating zone, the inner sleeve being made of the non-magnetic and electrically non-conductive material.

13. An apparatus according to claim 11, wherein the at least one housing portion comprises at least one outer part and one inner sleeve, the inner sleeve being supported against the at least one outer part.

14. An apparatus according to claim 11, wherein the at least one feed device comprises at least one of a gravimetric dosing unit and a feed screw machine.

15. An apparatus according to claim 11, wherein the inductive heating device comprises an energy supply device with a frequency converter which allows a frequency to be set, the frequency being greater than 1 kHz and less than or equal to 50 kHz.

16. A method according to claim 7, wherein the metallic bulk material and the additive are fed via a common feed opening.

17. The apparatus according to claim 13, wherein the at least one outer part is arranged outside of the inner space of at least one coil of the inductive heating device.

18. An apparatus for producing a mixture of a metallic matrix material and an additive, the apparatus comprising a multi-shaft screw machine comprising a housing, a plurality of housing bores formed in the housing, at least one feed opening leading into the housing bores, a plurality of treatment element shafts arranged in the housing bores such that the plurality of treatment shafts are drivable for rotation and an inductive heating device configured to form a heating zone, the housing comprising a plurality of interconnected housing portions arranged in succession in a conveying direction, at least one housing portion in the heating zone being made at least partially of a non-magnetic and electrically non-conductive material, the inductive heating device comprising at least one coil surrounding the treatment element shafts and the at least one coil defining an inner space, the at least one housing portion being made exclusively of the non-magnetic and electrically non-conductive material in the inner space, the treatment element shafts comprising an electrically conductive material at least in the heating zone, the multi-shaft screw machine further comprising a cooling device configured to dissipate thermal losses generated in the at least one coil, the cooling device comprising a cooling duct provided in the at least one coil, the cooling duct being configured to receive a flow of coolant;

at least one feed device configured to feed a metallic bulk material and an additive into the housing bores via the at least one feed opening.

19. The apparatus according to claim 18, wherein the at least one coil is in thermal contact with the cooling duct.

20. The apparatus according to claim 19, wherein the at least one coil is configured to be cooled via the flow of coolant passing in the cooling duct.

* * * * *